United States Patent
Walsh

(10) Patent No.: US 7,216,862 B2
(45) Date of Patent: May 15, 2007

(54) TOOL FOR SECURING CLAMP TO OBJECT

(75) Inventor: Leonard Michael Walsh, Bristol, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/785,439

(22) Filed: Feb. 24, 2004

(65) Prior Publication Data

US 2004/0187645 A1    Sep. 30, 2004

Related U.S. Application Data

(60) Provisional application No. 60/458,937, filed on Mar. 31, 2003.

(51) Int. Cl.
*B25B 1/00*    (2006.01)
*B25B 27/10*    (2006.01)

(52) U.S. Cl. .................... 269/6; 269/3; 269/166

(58) Field of Classification Search .................... 269/6, 269/3, 95, 100, 216, 143; 248/231.41; 29/281.1, 29/270

See application file for complete search history.

(56) References Cited

U.S. PATENT DOCUMENTS

| | | | |
|---|---|---|---|
| 4,747,588 A * | 5/1988 | Dillhoff | 269/6 |
| 4,893,801 A * | 1/1990 | Flinn | 269/6 |
| 4,926,722 A | 5/1990 | Sorensen et al. | |
| 5,009,134 A | 4/1991 | Sorensen et al. | |
| 5,022,137 A | 6/1991 | Sorensen et al. | |
| D320,919 S | 10/1991 | Sorensen | |
| 5,454,551 A * | 10/1995 | Hobday | 269/6 |
| 5,584,458 A * | 12/1996 | Rando | 248/231.41 |
| 5,853,168 A * | 12/1998 | Drake | 269/6 |
| 6,386,530 B1 * | 5/2002 | Marks | 269/6 |
| 6,434,807 B1 * | 8/2002 | Begin | 29/227 |
| 6,438,854 B1 * | 8/2002 | Kott, Jr. | 33/286 |
| 6,658,711 B1 * | 12/2003 | Benson | 29/237 |

* cited by examiner

*Primary Examiner*—Lee D. Wilson
(74) *Attorney, Agent, or Firm*—Colin L. Cini

(57) ABSTRACT

A tool for securing a clamp, such as a P clamp, to a mounting location, comprising: a first jaw; a second jaw; and an actuator to move the first jaw relative to the second jaw. The first jaw includes a retainer for a fastener. The method of attaching the clamp to the mounting location includes the steps of: placing a first fastener in the retainer; locating the clamp between the jaws; manipulating the actuator to tighten the clamp; and securing a second fastener to the first fastener.

23 Claims, 5 Drawing Sheets

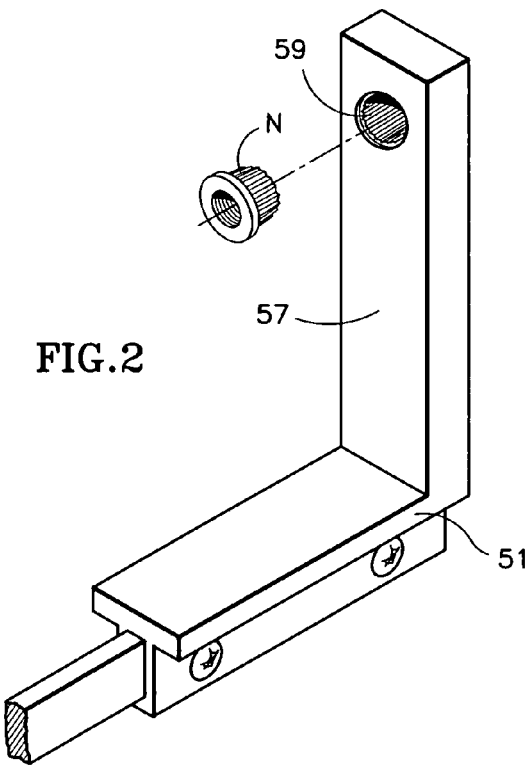
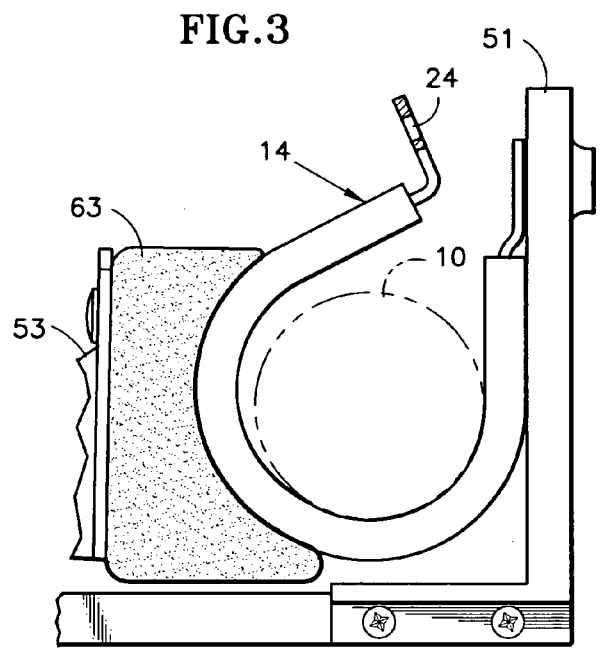
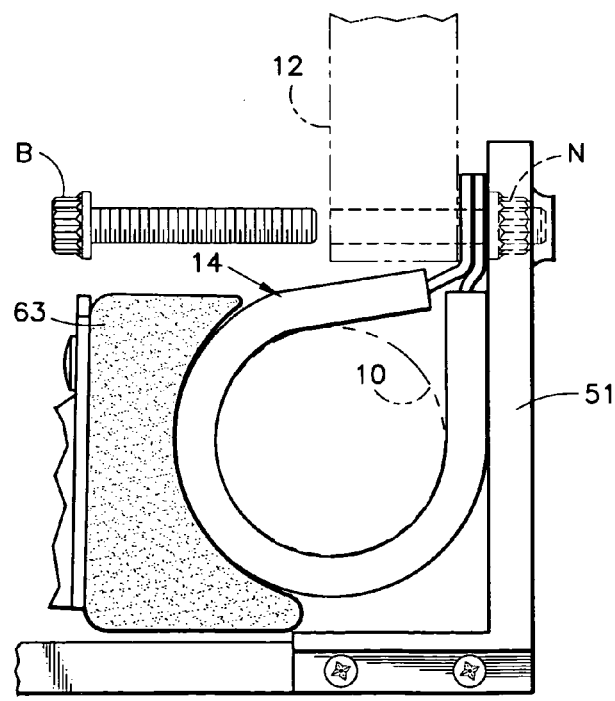

TOOL FOR SECURING CLAMP TO OBJECT

CROSS-REFERENCE TO RELATED APPLICATIONS

This Application claims the benefit of U.S. Provisional Patent Application No. 60/458,937 filed 31 Mar. 2003, herein incorporated by reference.

BACKGROUND OF THE INVENTION

This invention relates to a tool for securing a clamp to an object. Specifically, the present invention relates to a hand tool that assists a technician secure a clamp to an object.

Gas turbine engine externals, such as tubes and wire harnesses, must be adequately secured to the engine. Typically, technicians use "P clamps" to secure the externals to the engine. A P clamp is a metal band partially overmolded by an elastomeric material. The metal band provides rigidity to the P clamp to mount the external securely to the engine. The metal band compresses the elastomeric material against the external. The elastomeric material prevents contact between the external by the metal band, limits movement of the external, and can damp vibration caused by engine operation.

The process of securing the P clamp to the external can produce ergonomic issues. Since typical P clamps require approximately 22 pounds of compression force, a technician continuously applying such a compression force for extended periods of time can quickly tire. Repetitive applications of such compression forces (i.e. installing multiple clamps) can also tire the installer. The potential for ergonomic issues increases as the size of the external increases (i.e. larger P clamps needed) and as the length of the external increases (e.g. one engine could use up to 96 P clamps).

Conventionally, the installer followed these steps: (1) compress the clamp with a hand tool, such as a needle nose pliers; (2) continue applying the compression force to the clamp until the clamp achieves a set state; (3) discontinue applying the compression force to the clamp; (4) attach fasteners to the clamp; and (5) tighten the fasteners with suitable tools. While tightening the fasteners, the user may have to compress the clamp further with the tools to engage the fasteners. That requires the technician to manipulate simultaneously the pliers, the P clamp, and both fasteners.

Other practices include the use of small clips to keep the clamp in a compressed state or to secure the fastener to the clamp. The use of such small clips is not preferred in at least gas turbine engine application. The clips have a tendency to fail. The clips can also become foreign object debris (FOD) if not removed properly.

BRIEF SUMMARY OF THE INVENTION

It is an object of the present invention to provide an improved tool to secure a clamp to an object.

It is a further object of the present invention to provide a hand tool that assists a technician when securing a clamp to an object.

It is a further object of the present invention to provide a hand tool that can utilize the same power tool used for other purposes.

It is a further object of the present invention to provide an ergonomic tool.

These and other objects of the present invention are achieved in one aspect by a tool, comprising: a first jaw; a second jaw; and an actuator to move the first jaw relative to the second jaw. The first jaw includes a retainer for a fastener.

These and other objects of the present invention are achieved in another aspect by a tool for securing a P clamp to a mounting location. The tool comprises: a first jaw; a second jaw; and an actuator to move the first jaw relative to the second jaw. The first jaw includes a retainer for a fastener.

These and other objects of the present invention are achieved in another aspect by a method of attaching a clamp to an object. The method comprises the steps of: providing a tool with a first jaw having a retainer for a fastener, a second jaw, and an actuator to move the first jaw relative to the second jaw; placing a first fastener in the retainer; locating the clamp between the jaws; manipulating the actuator to tighten the clamp; and securing a second fastener to the first fastener.

BRIEF DESCRIPTION OF THE DRAWINGS

Other uses and advantages of the present invention will become apparent to those skilled in the art upon reference to the specification and the drawings, in which:

FIG. 2 is a perspective view of a portion of the tool in FIG. 1;

FIG. 3 is a detailed, elevational view, in partial cross-section, of a portion of the tool in FIG. 1 during a step in the attachment of a clamp to an object;

FIG. 4 is a detailed, elevational view of portion of the tool in FIG. 1 during a subsequent step in the attachment of a clamp to an object;

DETAILED DESCRIPTION OF THE INVENTION

Figure 1:
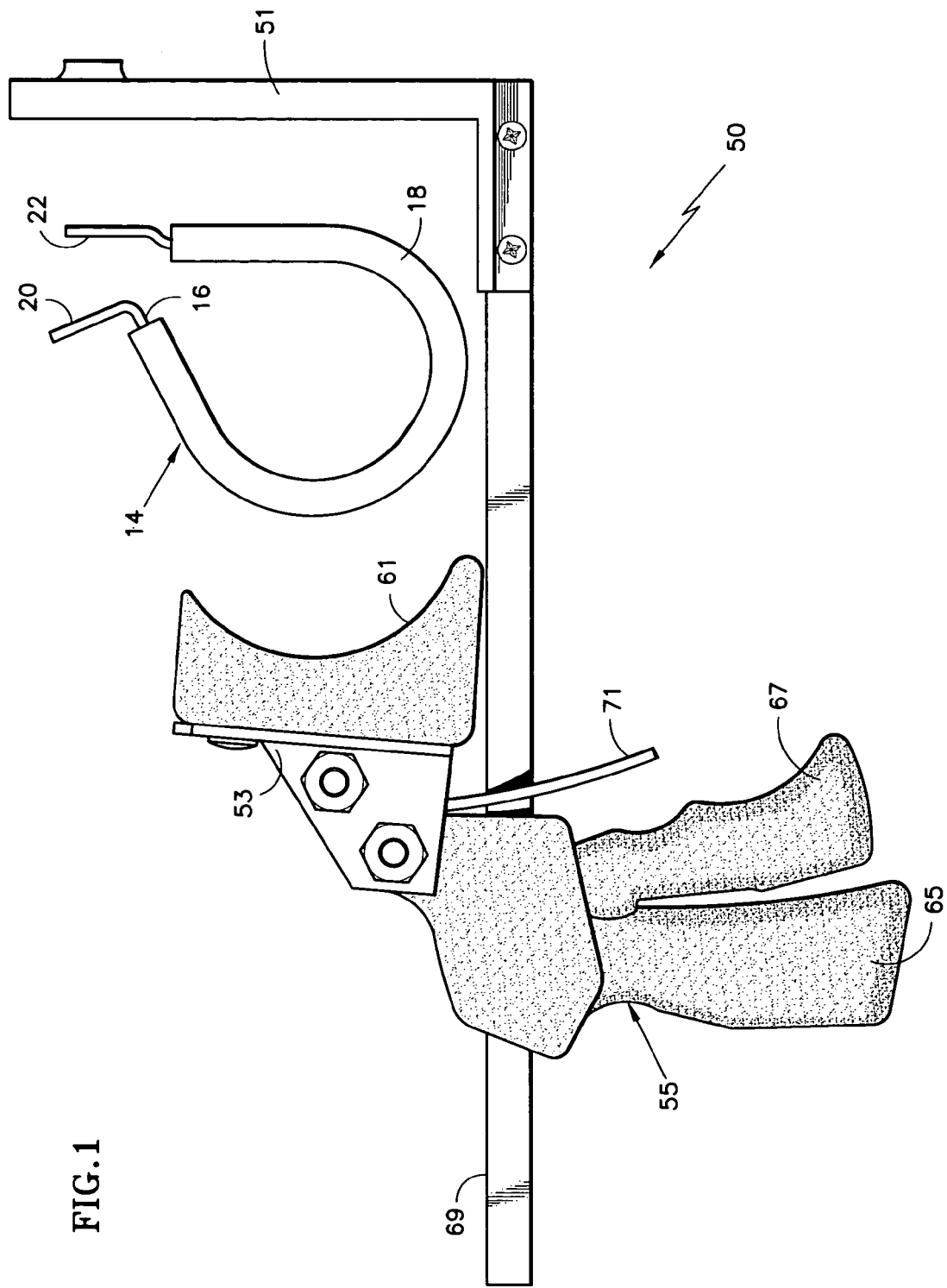
FIG. 1 is an elevational view of one alternative embodiment of a tool of the present invention.

FIGS. 1–4 display one alternative embodiment of a hand tool 50 of the present invention. The tool 50 helps a technician secure an object 10, such as a wire harness, tube or other external of a gas turbine engine, to a mounting location 12 on the engine using a device, such as a "P clamp" 14.

The P clamp 14 includes a metal band 16 partially overmolded by an elastomeric material 18. The band 16 provides rigidity to the P clamp, while the elastomeric material 18 prevents contact between the external 10 and the metal band 16. The band 16 is shaped so that ends 20, 22 of the band 16 can overlap. A fastener, such as bolt B, can extend through apertures 24 in the ends 20, 22 to engage another fastener, such as nut N, to draw the ends 20, 22 towards each other. To mount the external 10 to the engine, the bolt B could extend through a hole (shown in phantom in FIG. 4) in the mounting location 12.

The tool 50 includes opposed jaws 51, 53 and an actuator 55 that allows the jaws 51, 53 to move relative to each other.

Although the figures show jaws 51, 53 as being stationary and movable, respectively, the present invention could use any other suitable arrangement. Likewise, although the figures show the second jaw 53 as unitary with the actuator 55, the jaws 51, 53 could be separate from the actuator 55.

As best seen in FIG. 2, the first jaw 51 has a surface 57 facing the second jaw 53. The P clamp 14 abuts the surface 57 during use of the tool 50 as will be explained in more detail below. The surface 57 has a recess 59 therein sized to accept the nut N. When placed in the recess 59, the nut N is preferably flush with, or beneath, surface 57. As will become clear below, the recess 59 frees up one hand of the technician when mounting the P clamp 14 to the external 10 and the mounting location 12.

Although the first jaw 51 can accommodate a range of P clamp sizes, the tool 50 preferably allows for the replacement of the first jaw 51 with another jaw (not shown) adapted for a different type of clamp (not shown) or a different sized P clamp 14 using conventional techniques.

The second jaw 53 also has a surface 61 that faces the first jaw 51. The P clamp 14 abuts the surface 61 during use of the tool 50 as will be explained in more detail below. Since the tool 50 can preferably adapt to different types of clamps (not shown) or different sizes of P clamps 14, the second jaw 53 has a removable adapter 63. Each adapter 63 can have a shape specific to the desired application. The adapters 63 can mount to the jaw 53 using conventional techniques.

The actuator 55 could be any conventional mechanism. As seen in the figures, the actuator includes a handle 65, a spring-loaded trigger 67 to advance the actuator 55 along a rail 69 towards the first jaw 51. As seen in the figures, the second jaw 53 mounts to the actuator. Accordingly, advancing the actuator 55 towards the first jaw 51 advances the second jaw 53 towards the first jaw 51. The actuator also includes a release lever 71 to allow the technician to retract the second jaw 53 away from the first jaw 51.

The present invention could utilize alternative actuators 55. For example, the present invention could use a plunger-type actuator commonly used in caulk dispensers. In this alternative, the actuator remains stationary while the second jaw, secured to a plunger (not shown), advances towards the first jaw 51.

FIGS. 3 and 4 demonstrate the use of the tool 50. The technician initially places the P clamp 14 around the external 10. At this point, the P clamp 14 is in a relaxed state. That is, the ends 20, 22 are displaced from each other.

The technician places the nut N in the recess 59 of the first jaw 51, and positions the tool 50 so that the P clamp 14 resides between the jaws 51, 53. The technician then advances the actuator 55 so that the jaws 51, 53 abut the P clamp 14 and begin tightening the P clamp 14 around the external 10.

The technician then manipulates the tool 50 to position the P clamp 14 in the proper position. That is, the technician places the P clamp adjacent the mounting location 12. The technician then advances the actuator 55 further so that the apertures in the ends 20, 22 of the P clamp 14 align such as seen in FIG. 4. With the ends 20, 22 aligned, the technician can attach the fasteners.

Using the other hand (i.e. the hand not holding the tool 50), the technician inserts the bolt B through the hole in the mounting location 12 and through the apertures 24 in the ends 20, 22 of the P clamp 14. The technician then mates the bolt B with the nut N residing in the recess 59. Once the nut N fastens to the bolt B, the P clamp 14 securely holds the external 10 and the bolt securely holds the P clamp 14 to the mounting location 12. The technician can now release the actuator 55 to remove the tool 50 from the P clamp 14.

Figure 5:
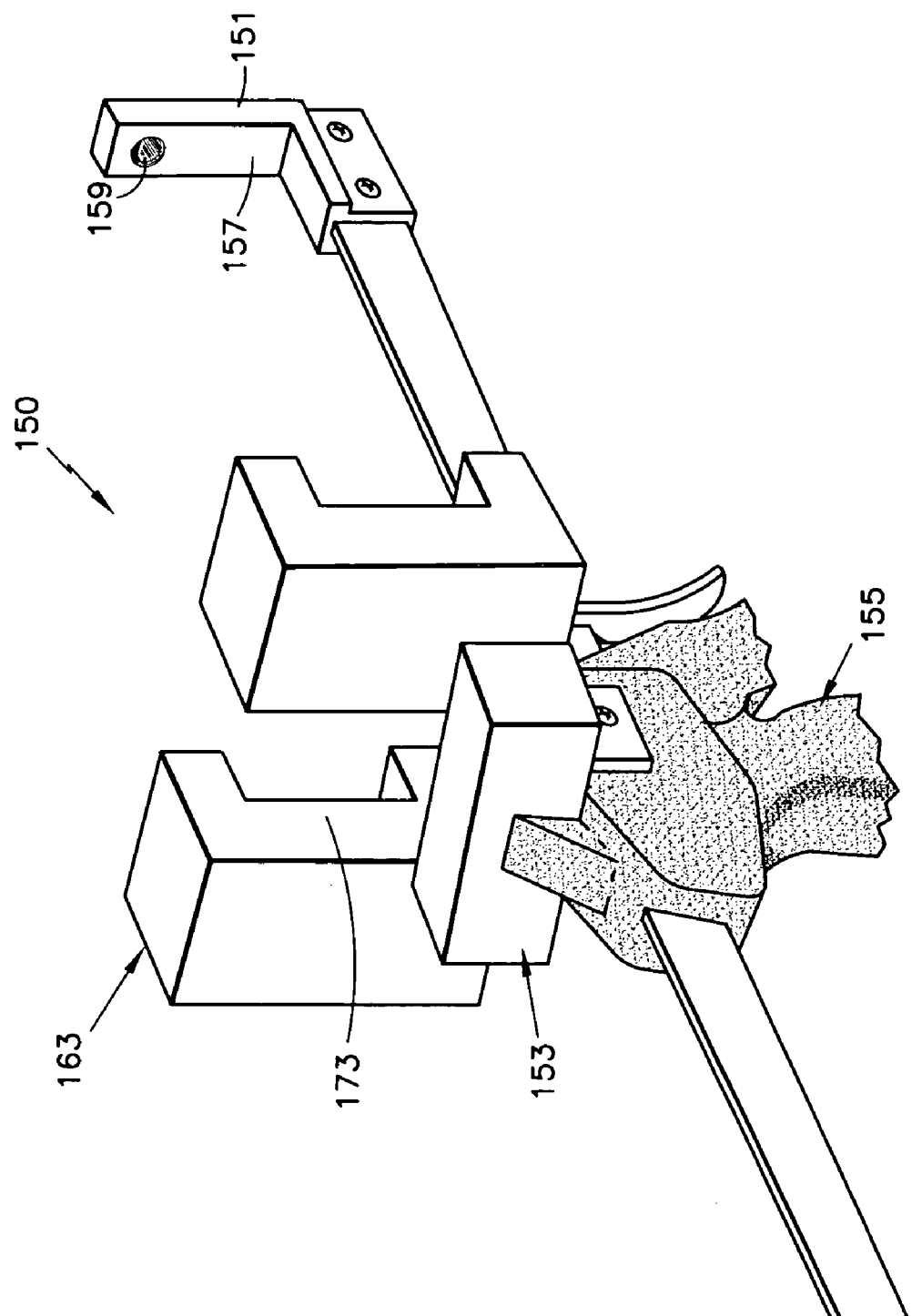
FIG. 5 is a perspective view of a portion of another alternative embodiment of a tool of the present invention.
Figure 6:
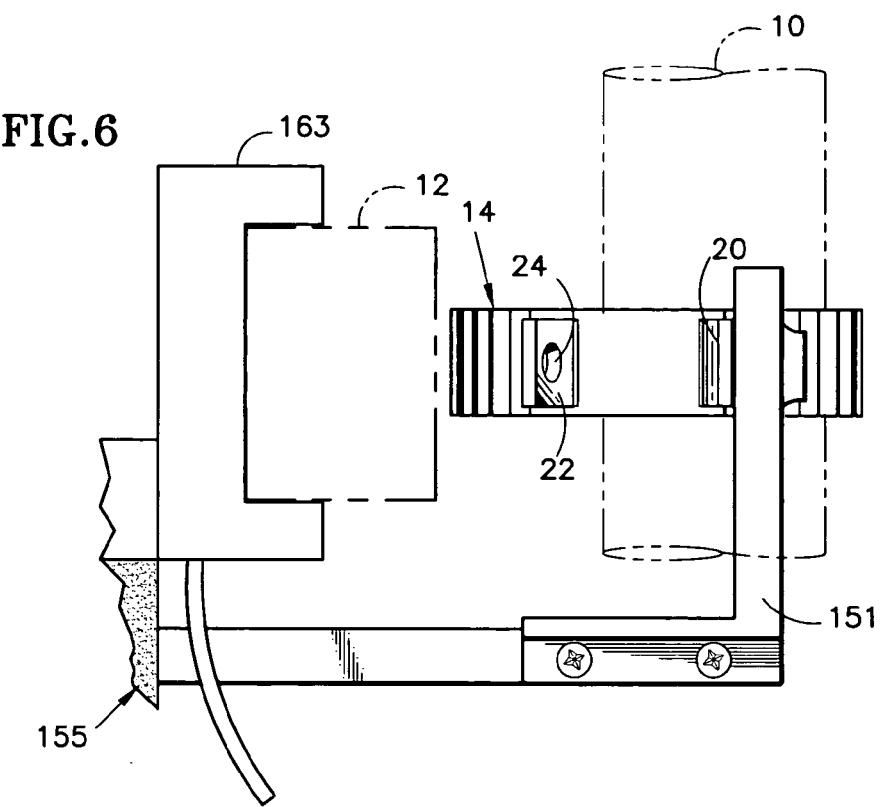
FIG. 6 is a detailed, elevational view of portion of the tool in FIG. 5 during one step in the attachment of a clamp to an object.

FIGS. 4–6 display another alternative embodiment of a hand tool 150 of the present invention. Since tool 150 has similar components to tool 50, only a brief summary of those components follows to avoid repetition. Where tool 150 uses different components, a more detailed description follows.

The tool 150 includes opposed jaws 151, 153 and an actuator 155 that allows the jaws 151, 153 to move relative to each other. The first jaw 151 has a surface 157 facing the second jaw 153 with a recess 159 therein to accept the nut N. The first jaw 151 is replaceable with a different jaw (not shown) to accommodate different types of clamp (not shown) or different sized P clamps 14.

Differently than with the tool 50, the second jaw 153 of tool 150 engages the mounting location 12 of the engine rather than the P clamp 14. Accordingly, the second jaw 153 includes a removable adapter 163 shaped to correspond with the mounting location 12. The tool 150 could use a variety of adapters 163 shaped for a specific mounting location 12. The adapters 163 can mount to the second jaw 153 using conventional techniques. As seen in FIG. 5, the adapter 163 includes a central passageway 173. As will be described in more detail below, the central passageway allows the bolt B to extend therethrough.

The actuator 55 could be any conventional mechanism, like the mechanism described above with tool 50, or the plunger-type actuators used in caulk dispensers.

Figure 7:
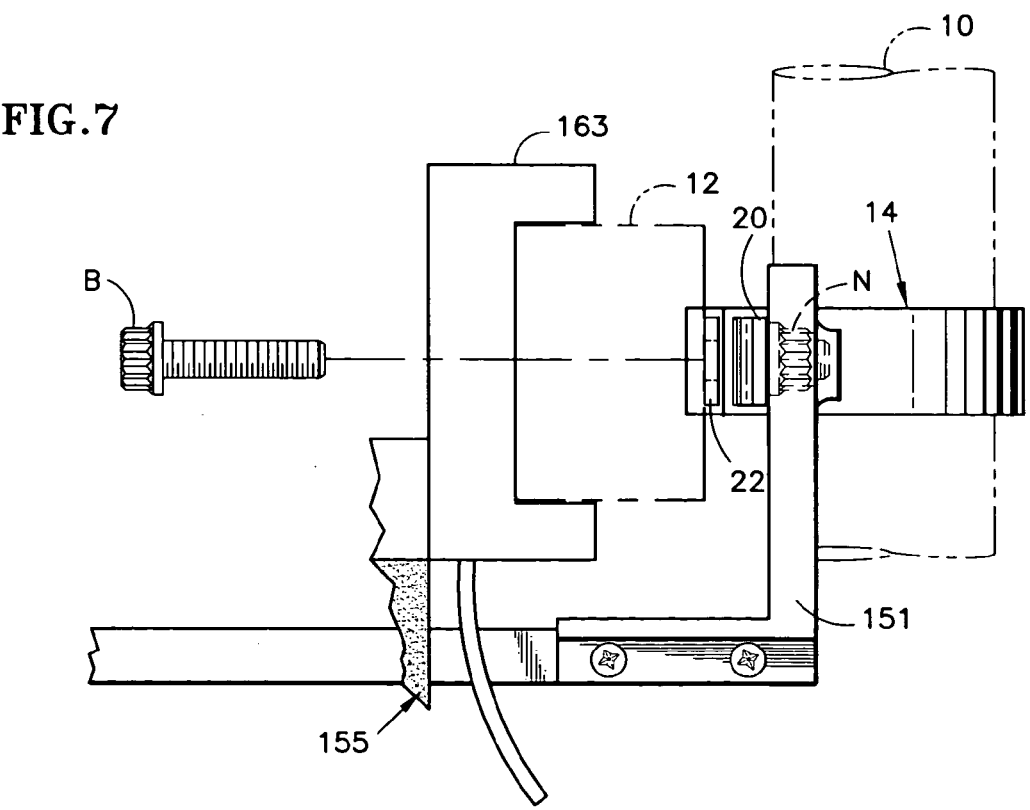
FIG. 7 is a detailed, elevational view of portion of the tool in FIG. 1 during a subsequent step in the attachment of a clamp to an object.

FIGS. 6 and 7 demonstrate the use of the tool 150. The technician initially places the P clamp 14 around the external 10. At this point, the P clamp 14 is in a relaxed state. That is, the ends 20, 22 are displaced from each other.

The technician places the nut N in the recess 59 of the first jaw 51, and positions the tool 50 so that the mounting location 12 and the P clamp 14 reside between the jaws 51, 53. The technician then advances the actuator 55 so that the jaws 51, 53 draw the P clamp 14 towards the mounting location 12 (see FIG. 6). As the jaws 51, 53 approach each other, the P clamp 14 begins tightening around the external 10. At a final position, the ends 20, 22 of the P clamp 14 align, and the ends 20, 22 abut the mounting location 12 such as seen in FIG. 7. Note that at this point, the technician could stop holding the tool 150 and the tool 150 would still hold the P clamp 14 against the mounting location 12.

The technician then inserts the bolt B through the hole in the mounting location 12 and through the apertures 24 in the ends 20, 22 of the P clamp 14. The bolt B then engages with the nut N residing in the recess 59. Once the nut N fastens to the bolt B, the P clamp 14 securely holds the external 10 to the mounting location 12. The technician can now release the actuator 155 to remove the tool 150 from the mounting location 12 and the P clamp 14.

Figure 8:
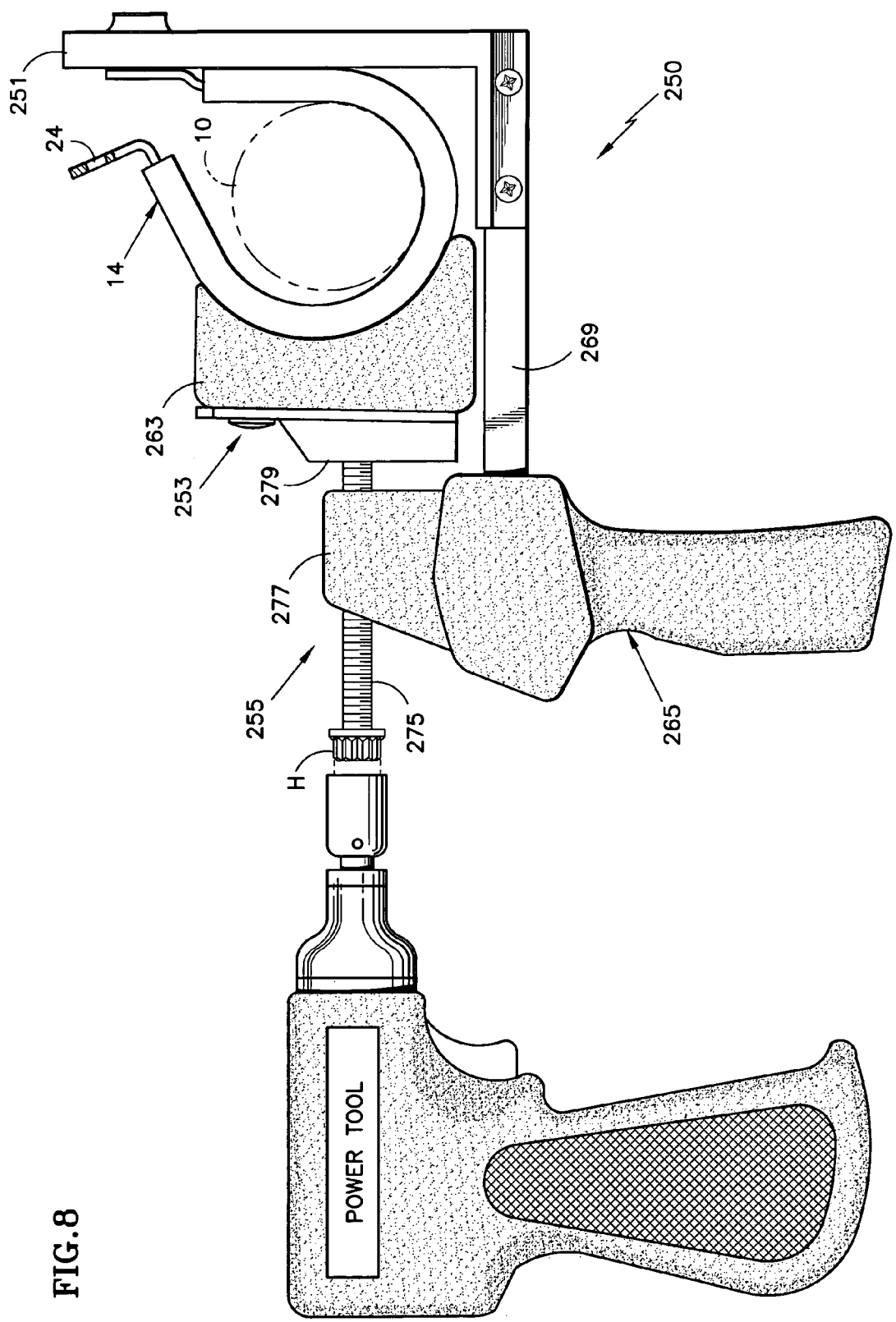
FIG. 8 is an elevational view of another alternative embodiment of a tool of the present invention.

FIG. 8 displays another alternative embodiment of a hand tool 250 of the present invention. Since tool 250 has similar components to tools 50, 150, only a brief summary of those components follows to avoid repetition. Where tool 250 uses different components, a more detailed description follows.

The tool 250 includes opposed jaws 251, 253 and a handle 265. The first jaw 251 mounts to a rail 269 extending from the handle 265. The first jaw 251 has a surface facing the second jaw 253 with a recess therein to accept the nut N. The first jaw 251 is replaceable with a different jaw (not shown) to accommodate different types of clamp (not shown) or different sized P clamps 14. Replacement can occur by removing the first jaw 251 from the rail 269.

The second jaw 253 also has a surface that faces the first jaw 251. The P clamp 14 abuts the surface during use of the tool 250. Since the tool 250 can preferably adapt to different types of clamps (not shown) or different sizes of P clamps 14, the second jaw 253 has a removable adapter 263. Each adapter 263 can have a shape specific to the desired application. The adapters 263 can mount to the jaw 253 using conventional techniques.

Differently than tools 50, 150, the second jaw 253 can move independently of the handle 265. The actuator 255 allows this independent movement, and includes a threaded rod 275 that extends through a threaded bore (not shown) in a flange 277 extending from the handle 265. One end of the rod 275 rotatably mounts to a plate 279 on the second jaw 253 using conventional techniques. The other end of the rod 275 includes a head H. As will become evident below, the head H preferably matches the head of the bolt B used to mount the P clamp 14 to the mounting location 12.

The technician uses the tool 250 as follows. First, the technician places the nut N in the recess of the first jaw 251, and positions the tool 250 so that P clamp 14 resides between the jaws 251, 253. The technician then advances the actuator 255 with assistance from a power tool. Since the head of the rod 275 matches the head of the bolt B, the technician can use the same power tool as will be used to tighten the P clamp 14 around the external 10.

Rotation of the rod 275 drives the second jaw 253 towards the first jaw 251. The jaws 251, 253 begin tightening the P clamp 14 around the external 10. At a final position, the ends 20, 22 of the P clamp 14 align. During this process, the technician also aligns the P clamp 14 with the mounting location 12.

The technician then inserts the bolt B through the hole in the mounting location 12 and through the apertures 24 in the ends 20, 22 of the P clamp 14. The technician utilizes the same power tool that just drove rod 275 to drive bolt B. The bolt B then engages the nut N residing in the recess of the first jaw 251.

Once the nut N fastens to the bolt B, the P clamp 14 securely holds the external 10 to the mounting location 12. The technician can now release the actuator by 255 rotating the rod 275 in the opposite direction. Clearly, the technician performs this task by reversing the direction of the power tool, then engaging the head H of the rod 275.

As an alternative, the actuator 255 could be hand operated. For example, the head H could be replaced with a knob (not shown). Similar to a pipe cutter, the technician could rotate the knob to move the second jaw 253.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. A tool for assisting the securing of a clamp having a fastener to a mounting location, the tool comprising:
 a first jaw;
 a second jaw;
 an actuator to move said first jaw relative to said second jaw; and
 wherein said first jaw includes a recess for accepting a first portion of the fastener and wherein said recess faces said second jaw, and
 wherein said second jaw includes an opening aligned with said recess in said first jaw to allow a second portion of the fastener to extend therethrough.

2. The tool of claim 1, wherein one of said jaws remains stationary.

3. The tool of claim 1, wherein one of said jaws is unitary with said actuator.

4. The tool of claim 1, wherein said jaws are removable.

5. The tool of claim 1, wherein said actuator is hand-operated.

6. The tool of claim 1, wherein said actuator is power tool-operated.

7. The tool of claim 6, wherein said actuator is sized so that the power tool used to operate said actuator can also drive a second portion of the fastener.

8. The tool of claim 1, wherein said actuator includes a threaded shaft.

9. A tool for securing a P clamp having a fastener to a mounting location, comprising:
 a first jaw;
 a second jaw;
 an actuator to move said first jaw relative to said second jaw; and
 wherein said first jaw includes a recess for accepting a first portion of the fastener and wherein said recess faces said second jaw and wherein said second jaw includes an opening aligned with said recess in said first jaw to allow a second portion of the fastener to extend therethrough.

10. The tool of claim 9, wherein one of said jaws remains stationary.

11. The tool of claim 9, wherein one of said jaws is unitary with said actuator.

12. The tool of claim 9, wherein said jaws are removable.

13. The tool of claim 9, wherein said actuator is hand-operated.

14. The tool of claim 9, wherein said actuator is power tool-operated.

15. The tool of claim 14, wherein said actuator is sized so that the power tool used to operate said actuator can also drive a second portion of the fastener.

16. The tool of claim 9, wherein said actuator includes a threaded shaft.

17. A method of attaching a clamp to an object, comprising the steps of:
 providing a tool with a first jaw having a retainer for a fastener, a second jaw, and an actuator to move said lint jaw relative to said second jaw;
 placing a first fastener in said retainer;
 locating said clamp between said jaws;
 manipulating said actuator to tighten said clamp; and
 securing a second fastener to said first fastener.

18. The method of claim 17, wherein said locating step includes placing the object between said jaws.

19. The method of claim 17, wherein said manipulating and securing steps are accomplished with a power tool.

20. The method of claim 19, wherein said manipulating step uses a first power tool and said securing step also uses the first power tool.

21. The method of claim 17, wherein said clamp is a P clamp.

22. The method of claim 21, wherein said object is a component of a gas turbine engine.

23. The method of claim 22, wherein said component is an external component of a gas turbine engine.

* * * * *